US011054322B2

(12) United States Patent
Steiner

(10) Patent No.: US 11,054,322 B2
(45) Date of Patent: Jul. 6, 2021

(54) DEVICE FOR MONITORING FORCE WHEN FIXING A TENSION CLAMP

(71) Applicant: Oetiker Schweiz AG, Horgen (CH)

(72) Inventor: Peter Steiner, Alpthal (CH)

(73) Assignee: Oetiker Schweiz AG, Horgen (CH)

( * ) Notice: Subject to any disclaimer, the term of this patent is extended or adjusted under 35 U.S.C. 154(b) by 143 days.

(21) Appl. No.: 16/492,648

(22) PCT Filed: Mar. 14, 2017

(86) PCT No.: PCT/EP2017/056012
§ 371 (c)(1),
(2) Date: Sep. 10, 2019

(87) PCT Pub. No.: WO2018/166585
PCT Pub. Date: Sep. 20, 2018

(65) Prior Publication Data
US 2021/0140839 A1 May 13, 2021

(51) Int. Cl.
G01L 5/00 (2006.01)
B25B 5/16 (2006.01)

(52) U.S. Cl.
CPC ............ G01L 5/0038 (2013.01); B25B 5/16 (2013.01)

(58) Field of Classification Search
CPC .......... G01L 5/0038; B65B 13/30; B25B 5/16
USPC .................................................. 73/862.542
See application file for complete search history.

(56) References Cited

U.S. PATENT DOCUMENTS

| 1,517,515 | A | | 12/1924 | McGary |
| 2,118,158 | A | | 5/1938 | Carlson |
| 3,641,629 | A | | 2/1972 | Beardsley |
| 3,904,234 | A | * | 9/1975 | Hill ........................ B25J 19/021 294/106 |
| 6,718,607 | B1 | * | 4/2004 | Gillet .................... B25B 25/005 29/229 |
| 8,356,641 | B2 | * | 1/2013 | Marelin ................ B65B 13/025 140/93.4 |
| 10,239,169 | B2 | * | 3/2019 | Maurer .................... B23Q 1/76 |
| 10,479,572 | B2 | * | 11/2019 | De Vittori ............. F16L 33/021 |
| 2009/0114308 | A1 | | 5/2009 | Marelin et al. |

(Continued)

FOREIGN PATENT DOCUMENTS

| RU | 2104907 | 6/1996 |
| RU | 2494022 | 4/2012 |
| WO | WO2016/096983 | 6/2016 |

Primary Examiner — Octavia Hollington
(74) Attorney, Agent, or Firm — Simpson & Simpson, PLLC; Michael Nicholas Vranjes

(57) ABSTRACT

A tool for fixing a tension clamp including a pair of levers pivotable about parallel axes and carrying at their ends plier jaws that can be moved toward each other and act on the clamp. To monitor the forces occurring during the locking of a buckle and a clamping band of the tension clamp, use is made of a device that has a housing fixed with respect to the tool and power transmission arms. Each power transmission arm is at one end elastically articulated to the housing, has at the other end a contact surface for a force sensor (18) attached to the housing and has, between its ends, a bore, in which the axis of the relevant tool lever is supported. A force/time or force/path curve obtained from the sensor signals is used as a measure of the quality of the locking between the buckle and the clamping band.

6 Claims, 3 Drawing Sheets

(56) References Cited

U.S. PATENT DOCUMENTS

2009/0194924 A1\* 8/2009 Ben-Gigi .................. B25B 5/06
269/165
2014/0007395 A1 1/2014 Hemingway et al.
2014/0299313 A1\* 10/2014 Messmer .............. E21B 19/161
166/77.51
2017/0349307 A1\* 12/2017 Seelos ..................... B65B 13/02

\* cited by examiner

DEVICE FOR MONITORING FORCE WHEN FIXING A TENSION CLAMP

CROSS-REFERENCE TO RELATED APPLICATIONS

The present application is the United States National Stage Application pursuant to 35 U.S.C. § 371 of International Patent Application No. PCT/EP2017/056012, filed on Mar. 14, 2017, which application is incorporated herein by reference in its entirety.

FIELD

The present disclosure relates to a device that monitors the force profile of a tool used to fix a tension clamp and thereby detect connections of insufficient quality between clamping band and a buckle.

BACKGROUND

International Patent Application Publication No. WO 2016/096983 A1 describes a tool for fixing a tension clamp, which tool has a pair of levers pivotable about parallel axes. The levers carry at their ends plier jaws, which are movable against each other and act on the clamp. The plier jaws are operated there via a control link so that they engage in windows of a buckle of the tension clamp and lock under deformation the buckle with the clamping band. For a secure fixation relatively large forces are applied.

It has been found that flawless and reproducible results in fixing tension clamps can be achieved, when a given force/time or force/path behavior of the forces exerted on the plier jaws is followed.

SUMMARY

The object of the invention is to provide a device which allows to monitor, in a tool of the mentioned type, the force profile when fixing a tension clamp and thereby detect connections of insufficient quality between clamping band and buckle.

This object is met by a device for force monitoring in a tool for fixing a tension clamp, the tool having a pair of levers pivotable about parallel axes which levers carry at their ends plier jaws which are movable against each other and act on the clamp. The device has a housing which is fixed with respect to the tool, and a pair of power transmission arms, each of which is at one end elastically articulated to the housing, has at the other end a contact surface for a force sensor mounted on the housing and has between its ends a bore in which the axis of the respective tool lever is supported.

Force/time or force/path curves obtained from the signals of the force sensors allow the detection of tension clamps for which the fixation between the clamping band and the buckle does not have a desired quality. In such a case, for example, a plier jaw can be exchanged to bring the quality to the desired level.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
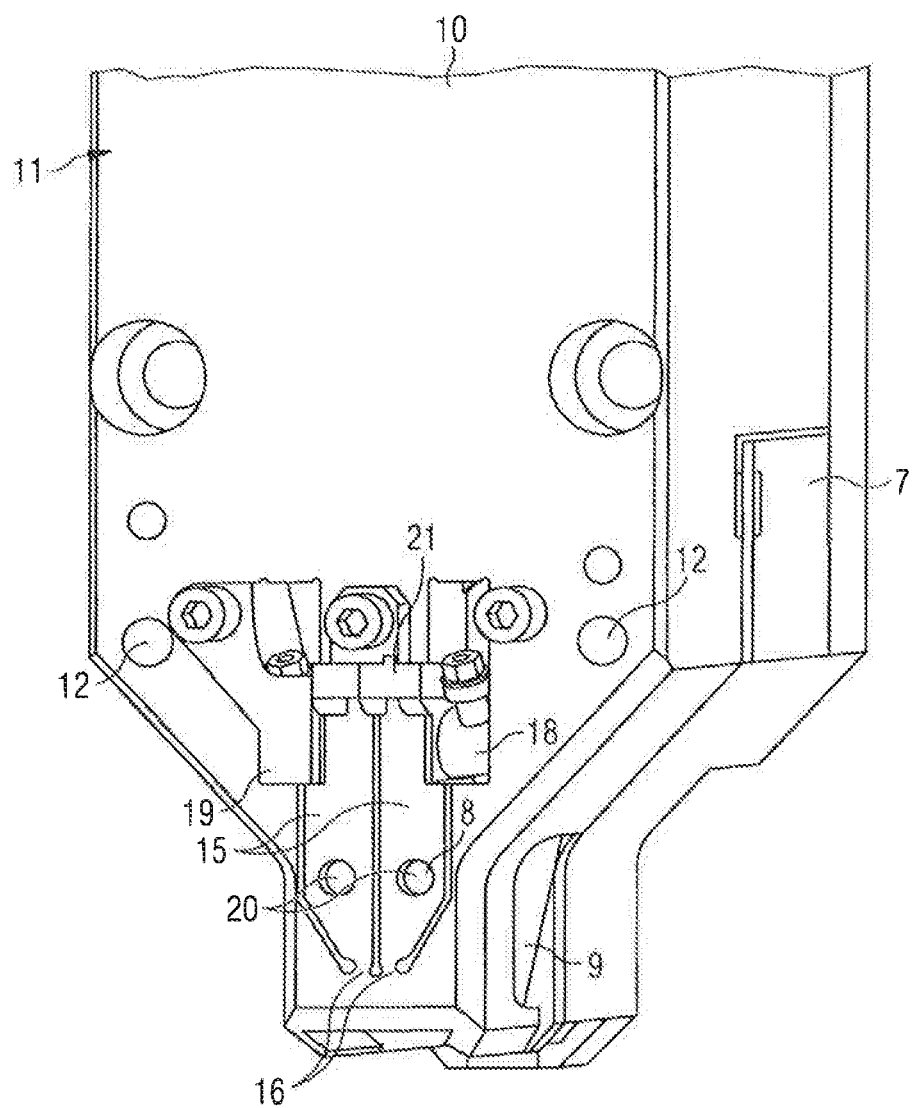
FIG. 1 is an isometric view of a device for monitoring the forces occurring during the fixing of a tension clamp; and, FIGS. 2 and 3 show parts of the device of FIG. 1.

The device shown in the drawings includes housing 11 comprising plate 10, which can be attached to tool 7 for fixing a tension clamp which tool is only indicated in FIG. 1. Such a tool comprises a pair of levers which are pivotable about parallel axes and carry at their ends plier jaws which are movable against each other and act on the clamp. In FIG. 1, the axes are indicated at 8 and the plier jaws at 9.

If it is a tool, as described in International Patent Application Publication No. WO 2016/096983 A1, in particular in FIG. 9 thereof, housing 11 is arranged in front of the head of tool 7 and is fastened thereto by bolts (not shown) passing through bores 12.

Figure 2:
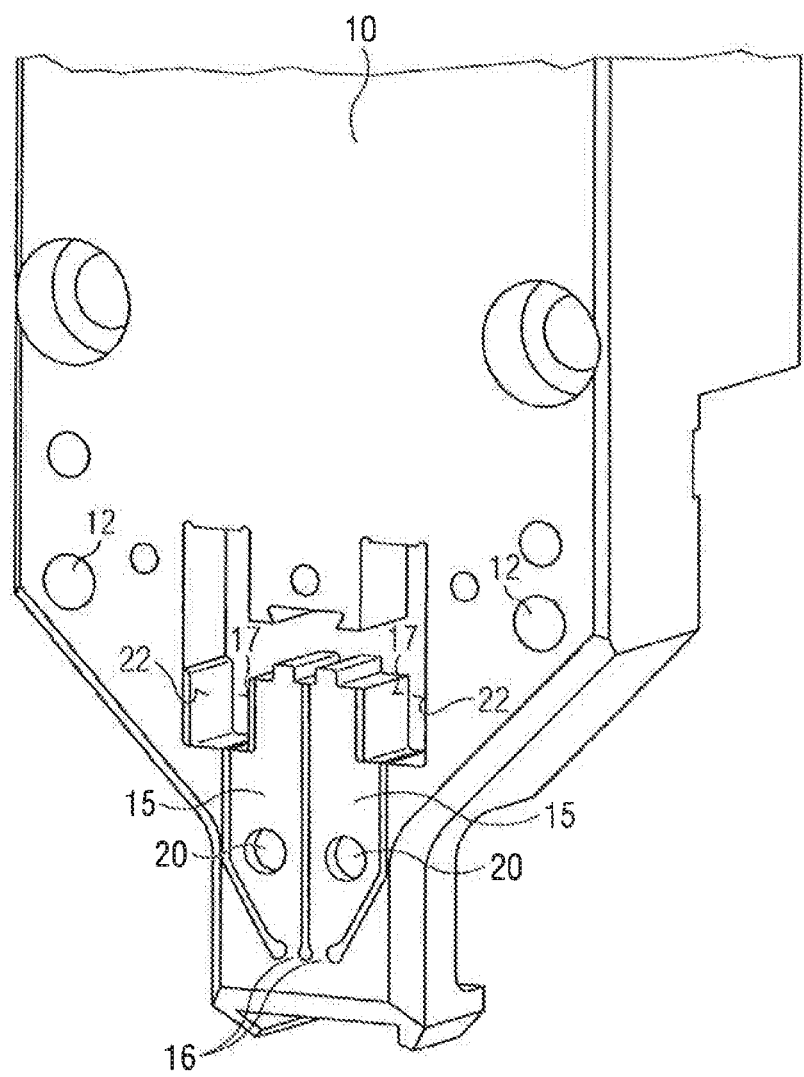

In housing 11, two power transmission arms 15 are formed, which are cut free from plate 10 and connected only at their lower ends in FIG. 1 with plate 10 via elastic joint 16 which is formed in this way. Each power transmission arm 15 has at its upper end contact surface 17 (see FIG. 2) for force sensor 18. Each force sensor 18 is attached to plate 10 via sensor holder 19 and biased against the respective contact surface 17. Each power transmission arm 15 has between its lower and upper ends bore 20 in which axis 8 of the respective plier jaw 9 of tool 7 is supported. After the installation of force sensors 18, contact surface 17 of each power transmission arm 15 extends in parallel to an opposing contact surface 22 formed in housing 11.

In order to protect housing 11 against overloading in the event of a manipulation error, the deflection of the upper ends of power transmission arms 15 is limited by bracket 21 embracing the ends.

Figure 3:
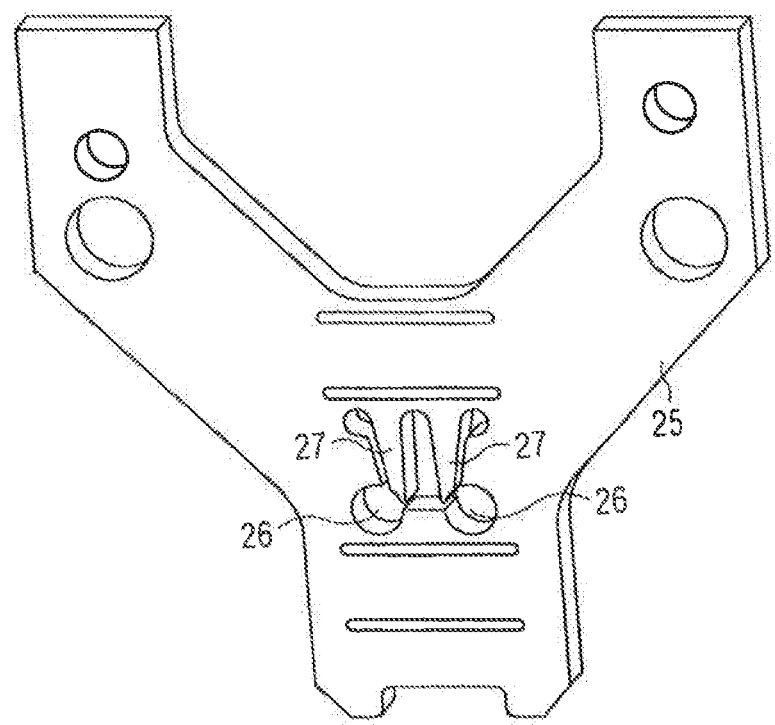

Spacer plate 25 (see FIG. 3) is inserted between plate 10 and the tool, which has two bores 26 penetrated by axes 8. From spacer plate 25, two spring legs 27 are cut free, the free lower ends thereof rest on axes 8 in the region of bores 26.

During operation of the tool, plier jaws 9 mounted on axes 8 are moved against each other to lock the buckle and the clamping band of the tension clamp with each other. Thereby axes 8 are pressed apart. This force is transmitted to power transmission arms 15, which in turn act on force sensors 18.

If a force/time or force/path curve determined from the sensor signals deviates from a predetermined behavior by a certain amount, the connection between the buckle and the clamping band of the tension clamp does not correspond to the desired quality and can be regarded as faulty.

The described parallel alignment of contact surfaces 17 for force sensors 18 is significant for reproducible precise measurements.

Spring legs 27 also serve to increase the measurement accuracy. They try to avoid backlash between spacer plate 25 and axes 8.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

7 tool
8 axis
9 plier jaws
10 plate
11 housing
12 bore
15 power transmission arm
16 joint
17 contact surface
18 force sensor
19 sensor holder
20 bore
21 bracket
22 contact surface
25 spacer plate
26 bore
27 spring leg

What is claimed is:

1. A device for monitoring a force in a tool for fixing a tension clamp, the tool comprising a pair of levers pivotable about parallel axes and carrying plier jaws at their ends that are movable toward each other and that act on the clamp, wherein a pair of power transmission arms, each of which is elastically articulated to a housing fixed relative to the tool at one end, has a contact surface at the other end for a force sensor, the force sensor connected to the housing and has a bore between both ends in which the axis of a respective lever is supported.

2. The device as recited in claim 1, wherein the force sensors are biased against their contact surfaces.

3. The device as recited in claim 1, wherein the contact surface of each power transmission arm is parallel to a second contact surface, which is formed in the housing.

4. The device as recited in claim 1, further comprising an overload protection for limiting the elastic articulation of the power transmission arms.

5. The device as recited in claim 1, wherein the power transmission arms are biased into a set position.

6. The device as recited in claim 5, further comprising a spacer plate arranged between the housing and the tool, wherein the spacer plate has two bores penetrated by the axes and spring legs for engagement with the axes in the region of the bores.

* * * * *